United States Patent [19]

Vanderpool

[11] Patent Number: 4,584,405

[45] Date of Patent: Apr. 22, 1986

[54] ACTIVATED CARBON CATALYSTS AND PREPARATION OF LINEAR POLYETHYLENE POLYAMINES THEREWITH

[75] Inventor: Steven H. Vanderpool, New Braunfels, Tex.

[73] Assignee: Texaco Inc., White Plains, N.Y.

[21] Appl. No.: 486,148

[22] Filed: Apr. 18, 1983

[51] Int. Cl.⁴ .............................................. C07C 85/06
[52] U.S. Cl. ..................................... 564/479; 502/180
[58] Field of Search ......................... 564/479; 502/180

[56] References Cited

U.S. PATENT DOCUMENTS

| | | | |
|---|---|---|---|
| 1,939,647 | 12/1933 | Arnold et al. | 502/180 |
| 2,017,069 | 10/1935 | Lazier | 564/479 |
| 2,201,050 | 5/1940 | Oberle et al. | 502/180 |
| 2,220,430 | 11/1940 | Stanley | 502/180 |
| 2,776,318 | 1/1957 | Wilke et al. | 502/180 |
| 3,584,061 | 6/1971 | Olstowski et al. | 502/180 |
| 4,229,374 | 10/1980 | Slaugh et al. | 564/479 |

FOREIGN PATENT DOCUMENTS 17638  2/1981  Japan ................................. 502/182

Primary Examiner—Charles F. Warren
Assistant Examiner—Joseph A. Boska
Attorney, Agent, or Firm—Robert A. Kulason; Jack H. Park; Kenneth R. Priem

[57] ABSTRACT

This invention is directed to activated carbon and chemically treated activated carbon catalysts and to their use in the production of predominantly linear polyethylenepolyamines from ethylenediamine and monoethanolamine.

3 Claims, No Drawings

ACTIVATED CARBON CATALYSTS AND PREPARATION OF LINEAR POLYETHYLENE POLYAMINES THEREWITH

BACKGROUND OF THE INVENTION

1. Technical Field of the Invention

This invention relates to the preparation of predominantly linear polyethylenepolyamines from ethylenediamine and monoethanolamine in the presence of unique activated carbon catalyst compositions.

2. Prior Art

Heretofore, polyethylenepolyamine compounds such as diethylenetriamine, triethylenetetramine and the higher homologs have been produced by the reaction of an alkyl halide such as ethylene dichloride with an amine such as ammonia or ethylenediamine at elevated temperatures and pressures. Normally, relatively high yields of predominantly non-cyclic polyethylenepolyamine compounds are obtained from this process with varying yields of heterocyclic amines. The large amounts of energy required to produce the reactants as well as the difficult separation procedures required to recover the more valuable linear polyethylenepolyamines diminishes the usefulness of the ethylene dichloride process. The hydrohalide salts of ammonia and the polyethylenepolyamine products must also undergo difficult and time consuming caustic neutralization to yield the free polyethylenepolyamines.

It has heretofore been known that phosphates can be used to catalyze amine reactions to produce predominantely heterocyclic rather than linear products. Thus, U.S. Pat. No. 3,297,701 teaches the use of aluminum phosphate to catalyze the reaction of ethanolamines and polyethylenepolyamines to yield cyclic compounds. U.S. Pat. No. 3,342,820 discloses the use of aluminum phosphate for the preparation of heterocyclic compounds such as triethylenediamine. As another example, U.S. Pat. No. 4,103,087 also discloses the use of aluminum phosphate catalysts for producing heterocyclic product compounds.

More recently, investigators have found that more linear products can also be obtained in a catalytic conversion. Thus, Ford et. al. U.S. Pat. No. 4,316,840 discloses the preparation of polyalkylenepolyamines from ethylene diamine utilizing a metal nitrate or sulfate as a catalyst. U.S. Pat. No. 4,314,083 discloses the reaction of ethylene diamine with monoethanolamine to prepare noncyclic polyalkylenepolyamines using, as a catalyst, a salt of a nitrogen or sulfur-containing compound.

In inventions more recently made in our laboratories, Brennan et. al. in U.S. Pat. No. 4,036,881 discloses the use of phosphorous-containing catalysts to catalyze the reaction of ethylenediamine with monoethanolamine. Excellent results were obtained when the reaction was conducted in an autoclave. However, when the phosphorous compound was supported on silica or diatomaceous earth, good results were obtained only at comparatively low conversions. Brennan et. al. U.S. Pat. No. 4,044,053 is also relevant in this regard. Brennan U.S. Pat. No. 4,103,087 discloses the use of pelleted aluminum phosphate to prepare di-(N-N-disubstituted amino-)alkanes. Good results have been obtained using a catalyst of this nature in batch-type reactions.

Activated carbon is generally characterized as a chemically inert material, prepared in a manner to provide good porosity and a higher surface area. It is widely used in the chemical area for the removal of unwanted impurities from chemical products. It has been used successfully for this purpose in the purification of amines by flowing a stream of an impure amine through a bed of activated carbon to improve color or other physical or chemical properties of the amine.

A group of recently filed U.S. patent applications in which I have participated disclose inventions directed to the reaction of ethylenediamine with monoethanolamine in the presence of catalysts comprising a compound of phosphorous supported on a Group IVb metal oxide (Vanderpool U.S. patent application Ser. No. 455,160 filed Jan. 3, 1983 and entitled "Catalysts and Preparation of Linear Polyethylenepolyamines Therewith"), such as: calcined pellets of titania having phosphorous deposited thereon (Vanderpool et. al. U.S. patent application Ser. No. 455,158 filed Jan. 3, 1983 entitled "Calcined Catalyst and Preparation of Linear Polyethylenepolyamines Therewith"); titania having phosphorous derived from polyphosphoric acid deposited thereon (Larkin et. al. U.S. patent application Ser. No. 455,159 filed Jan. 3, 1983, entitled "Linear Polyethylenepolyamine Preparation and Catalyst"); group IVb metal oxide pellets having phosphorous derived from phosphoryl chloride or phosphorous bromide deposited thereon (Vanderpool et. al. U.S. patent application Ser. No. 455,156 filed Jan. 3, 1983, entitled "Modified Catalysts and Preparation of Linear Polyethylenepolyamines Therewith"); titania pellets having phosphorous derived from a trialkyl phosphate or trialkyl phosphite deposited thereon (Watts et. al. U.S. patent application Ser. No. 455,155 filed Jan. 3, 1983, entitled "Preparation of Linear Polyethylenepolyamines from Novel Catalysts"); or pelleted titania having phosphorous derived from a diamminohydrogen phosphate deposited thereon (Renken U.S. patent application Ser. No. 455,153 filed Jan. 3, 1983, entitled "Supported Phosphate Catalysts and Preparation of Linear Polyethylenepolyamines Therewith",). Also included in this group of filings is Vanderpool U.S. patent application Ser. No. 455,154 filed Jan. 3, 1983, entitled "Catalytic Preparation of Linear Polyethylenepolyamines with Supported Catalyst") which discloses the use of zirconium silicate pellets having phosphorous deposited thereon and Vanderpool et. al. U.S. patent application Ser. No. 455,346 entitled "The Preparation of Linear Polyethylenepolyamines with Supported Catalysts" which discloses the use of alumina and/or aluminum phosphate having phosphorous derived from phosphoryl chloride deposited thereon. Also, Brennan U.S. patent application Ser. No. 453,841 entitled "Preparation of Linear Polyethylenepolyamines with an Aluminum Phosphate Catalyst" is directed to the use of a catalyst prepared by reacting alumina with phosphoric acid and that reaction product with ammonium hydroxide.

Zall U.S. Pat. No. 3,876,451 discloses a sewage treating process wherein activated carbon containing cations such as aluminum, manganese, zinc, iron, lithium or calcium is used to sequester phosphates in the waste effluent that would otherwise be discharged into environmental waters.

SUMMARY OF THE INVENTION

It has been surprisingly discovered that activated carbon can be used to effectively catalyze the reaction of monoethanolamine with ethylenediamine to prepare linear polyethylenepolyamines. It has also been discovered that the activity and/or selectivity of activated carbon for this purpose can be enhanced by chemical treatment to remove and/or to mask adverse effects resulting from the presence of impurities in the activated carbon.

DETAILED DESCRIPTION

The invention is directed to the discovery that activated carbon is surprisingly effective when used to catalyze the reaction of monoethanolamine and ethylenediamine for the preparation of predominantly linear polyethylenepolyamines. It has also been discovered that selectivity and/or activity can be improved by treating the activated carbon to remove and/or to mask the deleterious effects of impurities in the activated carbon.

Removal of impurities from the activated carbon can be achieved, for example, by treating the activated carbon with a strong mineral acid such as hydrochloric acid, hydrofluoric acid, sulphuric acid, aqua regia etc. (e.g., heating the activated carbon in the acid in particulate, flocculated or pelleted form at an elevated temperature of about 100° C. or more, such as the reflux temperature of the acid, cooling, decanting excess acid from the activated carbon and then neutralizing). For example, the activated carbon can be washed copiously with water until the wash water has a pH of about 6.

Supplementarily to impurities removal, as just described, the activated carbon can be treated with a reagent having catalytic activity, such as a phosphorous-containing chemical as hereinafter described in greater detail.

The reaction of ethylenediamine with monoethanolamine is effectively catalyzed at a temperature of from about 250° C. to about 400° C., preferably from about 300° C. to about 400° C. and a pressure of from about 500 to about 3000 psig. and preferably from about 1000 to about 2000 psig. Higher temperatures and/or pressures can be used, but there is no particular advantage in using such higher temperatures and/or pressures. The molar ratio of ethylenediamine to monoethanolamine may range from about 1:2 to about 5:1, preferably from about 1 to about 2 mols of ethylenediamine per mol of monoethanolamine.

The pelleted catalyst compositions of the present invention are normally employed as a fixed bed of catalyst in a continuous reaction system. In a continuous process of this nature, the time of contact of the reactants with the catalyst is one of the interrelated factors that those skilled in the art will adjust, along with temperature, pressure, bed geometry, pellet size, etc. in order to obtain a desired rate of reaction and, hence, a desired percentage of conversion of the reactants. Thus, in a continuous process, it is not necessary to drive the reaction to completion because unreacted feedstock components can be recycled to the reactor.

It is customary to use cylindrically-shaped catalyst pellets having a diameter essentially equal to the length thereof, such as diameters and lengths ranging from about 1/32" to about ⅜". It will be understood that the shape and dimensions of the pellets are not critical to the present invention and that pellets of any suitable shape and dimensions may be used as desired, by one wishing to practice the process of the present invention.

When cylindrical pellets of catalyst of the type described above are used, the weighted hourly space velocity may be varied within wide limits (e.g., 0.1 to 5 w/hr/w) in order to obtain a desired rate of conversion, as explained above. Normally, space velocities of about 0.5 to 2 w/hr/w will be employed.

As indicated, the catalyst compositions of the present invention are prepared by depositing a phosphorus compound on the activated carbon support. Pellets of the activated carbon may be prepared by extrusion or by compaction in conventional pelleting apparatus. It is also within the scope of the present invention to deposit the phosphorus compound on a powdered activated carbon followed by pelleting.

Any appropriate liquid or liquefiable phosphorus compound that is capable of forming a phosphate or phosphite on reaction with water can be used as a source of the phosphorus. For convenience, phosphoric acid will normally be used. However, other phosphorus compounds such as phosphoryl chloride ($POCl_3$), phosphorous acid, polyphosphoric acid, phosphorus halides, such as phosphorus bromide, alkyl phosphates and alkyl phosphites such as trimethyl phosphate, triethyl phosphate, trimethyl phosphite, triethyl phosphite, etc. may be utilized.

Preferably the catalyst composition is prepared by impregnating a preformed pellet. A suitable procedure to be used is to heat a liquid containing the liquid or liquefiable phosphorus compound at a temperature of about 100° C. to about 150° C. and to then add pellets in an amount about equal to the volume of the heated liquid. This treatment should be continued from about 0.5 to about 5 hours. At the end of that time, the resulting mixture of pellets and liquid is cooled, decanted to remove excess liquid followed by washing with an amount of water adequate to substantially completely remove un-adsorbed, unreacted liquid. Temperatures above 150° C. can be used, if desired, but there is no particular advantage in doing so.

It will be understood that the phosphorous that is present on a thus-treated pellet is not present as elemental phosphorous, but rather as a phosphate or phosphite. This is demonstrated by the fact that repeated washing will not remove all of the phosphorous. However, the exact nature of the bonding to the activated carbon is not completely understood.

The amount of phosphorous that is bonded or otherwise adheres to the support is a function of heating and other conditions used in the treating step and is also a function of the chemical identity of the phosphorous compound that is used as a source of phosphorous. Under the treating conditions exemplified above, at least about 2.5 wt. % of phosphorous is caused to bond or otherwise permanently adhere to the pellets. There is an upper limit to the amount of phosphorous that bonds or otherwise permanently adheres to the support. This upper limit is, as indicated, a function of both the treating conditions and the chemical used as a source of the phosphorous. Normally, the maximum amount of phosphorous that can be caused to bond or otherwise permanently adhere to the pellets is within the range of about 2 to 10 wt. %.

As a matter of convenience, the normal practice is to use only one chemical as a phosphorous source (e.g., phosphoric acid). However, mixtures of two or more such reagents may be used, if desired.

There are many compounds which can be formed from the reaction of ethylenediamine and monoethanolamine besides the preferred linear polyethylenepolyamines such as diethylenetriamine, triethylenetetramine, tetraethylenepentamine and pentaethylenehexamine. Less desirable cyclics and other compounds, such as piperazine, N-(2-aminoethyl) ethanolamine and N-(2-aminoethyl)piperazine, are also formed. The more desired linear polyethylenepolyamines can be easily recovered from the reaction product mixture by conventional methods such as distillation. Such distillation recovery methods are well known in the art. An outstanding advantage of the claimed invention is that the lower molecular weight polyethylenepolyamines recovered from the reaction mixture can be further reacted with monoethanolamine to produce a larger percentage of the higher molecular weight linear polyethylenepolyamines.

The following examples will further illustrate the preparation of predominantly linear polyethylenepolyamines from ethylenediamine and monoethanolamine by the use of catalysts of the present invention. They are given by way of illustration and not as limitations on the scope of the invention. Thus, it will be understood that reactants, proportions of reactants, and time, temperature and pressure of the reaction steps may be varied with much the same results achieved.

For purposes of convenience and brevity, the reactant compounds employed and the products obtained have been abbreviated in the following examples and tables. The abbreviations employed for these various compounds are:

EDA—ethylenediamine
MEA—monoethanolamine
PIP—piperazine
DETA—diethylenetriamine
TETA—triethylenetetramine
TEPA—tetraethylenepentamine
AEEA—N-(2-aminoethyl)ethanolamine
AEP—N-(2-aminoethyl)piperazine
HEP—N-(hydroxyethyl)piperazine The activated carbon (5484-26) used in the following experiments was a commercially available pelleted activated carbon sold by the American Novit Company of Jacksonville, Fla. under the name "Novit-RBl".

The reference catalyst (5464-74) was a 40% phosphate on alumina catalyst of the type disclosed in Brennan U.S. Pat. No. 4,103,087 at column 50, lines 50-54.

EXAMPLE 1

In order to prepare catalyst 5484-66, 210 cc of the activated carbon pellets were heated at 150° C. in 250 cc of 85% $H_3PO_4$ for four hours. The catalyst was then isolated by decantation, washed to neutral pH and dried.

EXAMPLE 2

Catalyst 5484-67 was prepared by treating activated carbon pellets as described in Example 1. Thereafter the dry catalyst was soaked in excess saturated aluminum nitrate, $al(NO_3)_3$ solution for four hours, washed and dried.

EXAMPLE 3

About 210 cc of activated carbon pellets were boiled in aqua regia for two hours at about 150° C. The pellets were isolated by decantation and the procedure was repeated using fresh aqua regia. The pellets were then washed with water to a pH of 6 and dried. Next, the pellets were heated at 125° C. for about 70 hours in 85% $H_3PO_4$. Thereafter the pellets were washed with water and dried.

EXAMPLE 4

Preparation of Polyethylenepolyamines from Ethylenediamine and Monoethanolamine Using Activated Carbon Catalysts The catalysts described in Table I were utilized for the conversion of ethylenediamine and monoethanolamine to a polyethylenepolyamine reaction product in a 100 cc continuous reactor system. Pellets were placed in the reactor and the feedstock that was fed to the reactor was a mixture of ethylenediamine and monoethanolamine in a molar ratio of about two mols of ethylenediamine per mol of monoethanolamine.

In order to obtain a basis for comparison, the reaction temperature was varied so as to obtain about a 65% conversion of the monoethanolamine feedstock.

The reaction product was periodically sampled and analyzed by gas chromatographic analysis of the crude reactor effluent. Results were calculated on a feed-free basis.

The catalysts tested and results obtained in the series of tests are set forth in Table II. In general, each feedstock was run for at least 2½ hours to make sure that reaction conditions had stabilized.

TABLE I

| DESCRIPTION OF CATALYSTS | |
|---|---|
| Catalyst No. | Description |
| 5464-74 | 40 wt % Phosphate on alumina |
| 5484-26 | Activated carbon |
| 5484-66 | Activated carbon treated with phosphoric acid |
| 5484-67 | Activated carbon treated with phosphoric acid and then with aluminum nitrate |
| 5484-90 | Activated carbon treated with aqua regia and then with phosphoric acid |

TABLE II

ACTIVATED CARBON CATALYSIS IN THE MANUFACTURE OF POLYETHYLENEPOLYAMINES FROM ETHYLENEDIAMINE AND MONOETHANOLAMINE

| Ex. | Catalyst | Temp. 0° C. @ 65% M.E.A. Conv. | Selectivity | | | | | | Ratio: DETA PIP |
|---|---|---|---|---|---|---|---|---|---|
| | | | PIP | DETA | AEEA | AEP & HEP | TETA | TEPA | |
| A | 5464-74 | 329 | 5.2 | 38.5 | 2.6 | 4.5 | 18.3 | 5.9 | 7.4 |
| B | 5484-26 | 315 | 6.6 | 21.8 | 1.9 | 13.8 | 17.3 | 4.0 | 3.3 |
| 1 | 5484-66 | 300 | 5.7 | 36.8 | 1.8 | 11.8 | 18.3 | 5.0 | 6.5 |
| 2 | 5484-67 | 311 | 6.3 | 24.2 | δ | 7.3 | 14.5 | 4.0 | 3.8 |
| 3 | 5484-90 | 294 | 5.5 | 48.5 | 0.4 | 6.0 | 17.0 | 3.7 | 8.8 |

Example A of Table I is provided to show the general level of activity and selectivity obtainable in a continuous reaction system with the most effective catalyst available to the inventor prior to the present invention.

Example B, where untreated activated carbon was used, demonstrates the basic present invention. The activated carbon is shown to be more catalytically active than 5464-74 because 65% conversion of MEA was obtained at a lower temperatures of 315° C., as compared with the 329° C. for Example A. Good and accoptable selectivity to non-cyclic polyethylenepolyamines was obtained although the yields of DETA, TETA and TEPA were somewhat lower than those obtained in Example A.

In Example 1, it is shown that treatment of the activated carbon with phosphoric acid significantly improved both the activity and the selectivity of the catalyst. A selectivity essentially equivalent to Example A, was obtained but at a lower temperature of only 300° C.

Example 2 gave results essentially equivalent to those shown in Example B.

The best results were obtained in Example 3, where impurities were removed from the activated carbon before the treatment with phosphoric acid. When Example 3 is compared with Example A, it is seen that the catalyst of Example 3 had outstanding activity, gave a significantly improved yield of DETA and that the yield of AEEA was negligible. A comparison of Example B with Example 1 again demonstrates the outstanding activity and selectivity that were obtained.

There are times when it is desirable to obtain greater yields of TETA and/or TEPA than those demonstrated in Table II. In such instances, the DETA can be recycled by substituting DETA for all or a part of the ethylenediamine feedstock.

This specification includes data relating to the invention disclosed and claimed herein. For comparative purposes data is disclosed in this specification that is also disclosed and claimed in copending Vanderpool and Watts U.S. patent application Ser. No. 06/486,141, filed Apr. 18, 1983, of an even date herewith, and entitled "Preparation of Linear Polyethylenepolyamines Using Activated Carbon Catalysts".

The foregoing examples of the present invention have been given by way of illustration only and are not intended as limitations on the scope of the invention which is defined by the following claims.

I claim:

1. In a method wherein monoethanolamine is reacted with ethylenediamine in the presence of a catalyst to provide an essentially noncyclic product comprising polyethylenepolyamines, the improvement for conducting said process on a continuous basis which comprises:
   a. using a catalyst consisting essentially of pelleted activated carbon,
   b. continuously contacting a mixture of ethylenediamine and monoethanolamine in a molar ratio of about 1 to 5 mols of ethylenediamine per mol of monoethanolamine with said pelleted catalyst at a temperature of about 200° to about 400° C. and a pressure of about 500 to about 3000 psig. to obtain an essentially noncyclic reaction product.

2. A method as in claim 1, wherein the activated carbon catalyst is a catalyst that has been pretreated with a strong mineral acid.

3. A method as in claim 2, wherein the strong mineral acid is aqua regia.

* * * * *